(12) United States Patent
Hillman

(10) Patent No.: US 7,536,260 B2
(45) Date of Patent: May 19, 2009

(54) METHOD AND SYSTEM FOR CREATING A WEATHER-RELATED VIRTUAL VIEW

(76) Inventor: Daniel C. A. Hillman, 436 E. 76th St., #12, New York, NY (US) 10021

( * ) Notice: Subject to any disclaimer, the term of this patent is extended or adjusted under 35 U.S.C. 154(b) by 168 days.

(21) Appl. No.: 11/369,093

(22) Filed: Mar. 6, 2006

(65) Prior Publication Data

US 2007/0208513 A1    Sep. 6, 2007

(51) Int. Cl.
*G06F 19/00* (2006.01)

(52) U.S. Cl. .......................................... 702/3

(58) Field of Classification Search .............. 702/1–3; 709/219; 725/37; 707/10
See application file for complete search history.

(56) References Cited

U.S. PATENT DOCUMENTS

| | | | | |
|---|---|---|---|---|
| 5,848,378 A | * | 12/1998 | Shelton et al. | 702/3 |
| 6,580,950 B1 | * | 6/2003 | Johnson et al. | 700/17 |
| 6,792,615 B1 | * | 9/2004 | Rowe et al. | 725/37 |
| 7,275,089 B1 | * | 9/2007 | Marshall et al. | 709/219 |
| 2007/0043839 A1 | * | 2/2007 | Amadio et al. | 709/222 |

* cited by examiner

*Primary Examiner*—Bryan Bui
(74) *Attorney, Agent, or Firm*—Howard M. Gitten; Edwards Angell Palmer & Dodge LLP

(57) ABSTRACT

A weather-related image of a remote location is displayed at a local computer by first storing a plurality of digital images of the remote location. Then, data associated with each respective image is stored. The data is of the kind capable of being used to identify a respective remote weather condition associated with each image. A local weather condition is then determined. An image having a remote weather condition similar to the local weather condition is selected and displayed at the local computer.

12 Claims, 3 Drawing Sheets

METHOD AND SYSTEM FOR CREATING A WEATHER-RELATED VIRTUAL VIEW

BACKGROUND OF THE INVENTION

This invention is directed to a method and system for creating a view at the screen of an individual's computer, and more particularly, creating a view corresponding to a remote location with conditions similar to those at the location of the viewer.

Computer users, trapped at their desks, often seek relief or a break by staring out the window or by searching the Internet for views of other places. It is known in the art to transmit a synchronous photos or camera video across the World Wide Web to a user's computer. However, these views are often unsatisfying as they do not truly mimic the function of a virtual window. The synchronous photos and web-based videos are not correlated with the user's actual environment.

First, the uncorrelated images, such as those from a synchronous, distant web cam, may prove useless during a user's waking hours. If one is viewing a web view from a remote location on the other side of the world, when viewing during the day, the synchronous web cam feed may be entirely pitch black as it will be nighttime corresponding to the user's day. By way of example, a web cam at the Grand Canyon would be, aside from the possible stars and moonlight, completely dark to a user in Paris for most of the Parisian daytime. It can be readily seen that nature web cams are useless to viewers separated from the camera by several time zones.

Secondly, as the virtual view becomes larger, of higher quality, and therefore more realistic, the immersive experience of the virtual view will be disappointing. This is because the images viewed in lieu of the view from the viewer's actual window will prove disorienting if in fact the conditions of the virtual view, which are designed to resemble a window, do not correspond to the conditions at the actual location of the user. In other words, seeing a virtual rainy day at the remote location when in fact it is sunny at the actual location of the view.

Accordingly, it is desired to provide a system and method for providing a virtual view, which overcomes the shortcomings of the prior art.

BRIEF SUMMARY OF THE INVENTION

A weather-related image of a remote location is displayed at a local computer by first storing a plurality of digital images of the remote location. Then, data associated with each respective image is stored. The data is of the kind capable of being used to identify a respective remote weather condition associated with each image. A local weather condition is then determined. An image having a remote weather condition similar to the local weather condition is selected and displayed at the local computer.

BRIEF DESCRIPTION OF THE DRAWINGS

The foregoing and other objects, features and advantages of the invention will be apparent from the following more particular description of preferred embodiments of the invention as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The invention is directed to a method of providing a view of a remote location across the World Wide Web (or other network capable of connecting a server to a computer) to a user at a computer, which corresponds to the view at the remote location as if the conditions at the viewer's location were applied. By way of example, if it is determined that a viewer's local U.S. conditions correspond to a rainy afternoon and the remote location to be viewed is Paris, France, then, rather than the actual nighttime Paris, a rainy afternoon at the viewer's local date and time will be used to create and present a rainy Parisian afternoon for the date and time corresponding to the viewer's local date and time as the virtual view.

Figure 1:
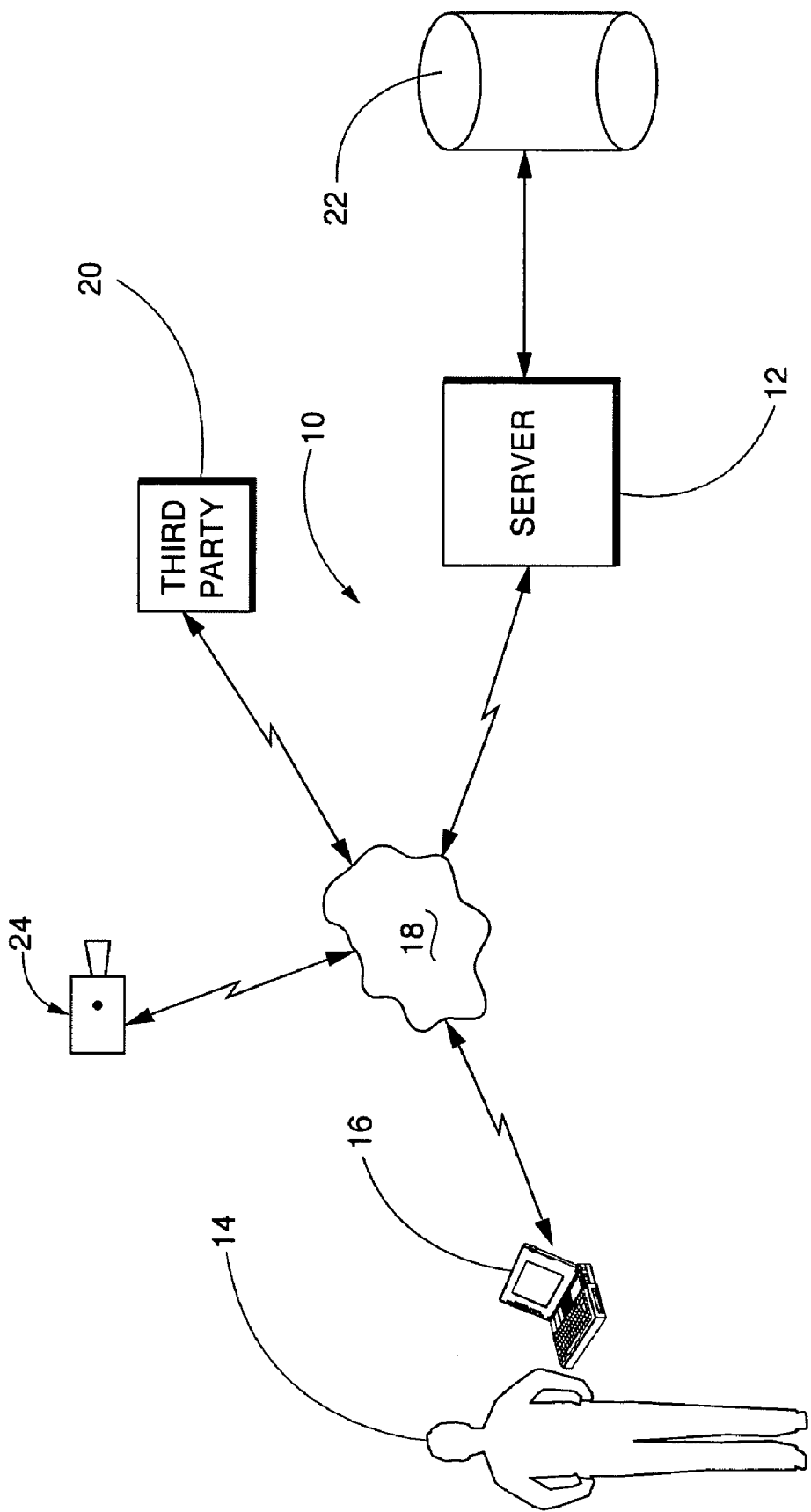
FIG. 1 is a schematic diagram of a system for providing a more realistic virtual view of a remote location.

Reference is made to FIG. 1 in which a system, generally indicated as 10 is provided. System 10 includes a server 12 operatively communicating with a database 22. Server 12 communicates with users ("viewers") 14 at a viewer computer 16 through Internet 18. Server 12 may also communicate with third party databases 20 through Internet 18. Server 12 is also associated with a camera 24 for collecting images at remote locations and storing the images in database 20.

In one embodiment, server 12 provides an interactive web-based portal such as a web page for interacting with viewer 14. It should be noted that computer 16 may be any interactive device, which allows viewer 14 to communicate with server 12 and receive images at viewer computer 16. It should be noted that images may be static as in a still camera or dynamic as with video cameras or as they are known in the art "web cams".

In a preferred embodiment, to conserve bandwidth, server 12 may be a local server at the same physical location as computer 16 or actually, for the purposes of the invention, may be incorporated in computer 16. Database 20, including the stored images, may be the hard drive of server 12 or computer 16, or a removeable portable database such as a disk, DVD, flash stick, or any other removable database or the like. In this way, the only networked communication is, as will be discussed below, the communication from computer 16 or server 12 to a third party database to determine the local weather conditions. The rest may be performed locally at a local server 12. In this embodiment, rather than the day-dreaming "study break" at computer 16, server 12 may be associated with a large flat panel screen so that much like a virtual fireplace, a virtual window to Paris may be shown in an apartment in New York on the wall of the apartment.

Furthermore, to complete the immersion experience, audio input may be provided such as the sound of rain, animals, city traffic or the like. It should be noted that the preferred embodiment is an Internet-based system. However, the system may include any device capable of determining the location of the virtual viewer, receiving images of a selected remote location, and providing a view from the remote location to the viewer as will be described below. The computing device can communicate with viewer 14 by Internet, or any other non web-based means such as radio frequency, telephone, cable television, handheld personal data accessory ("PDA") or cellular phone by way of non-limiting examples.

Database 22 stores images taken by camera 24, whether moving or still, of the remote location at a variety of dates, a variety of times during the day for each of the variety of dates, and a variety of conditions, such as snow, cloudy, less cloudy, sunny, rainy or sleet corresponding to each time for each day. Therefore, it becomes apparent that first the database 22 must be created.

Figure 2:
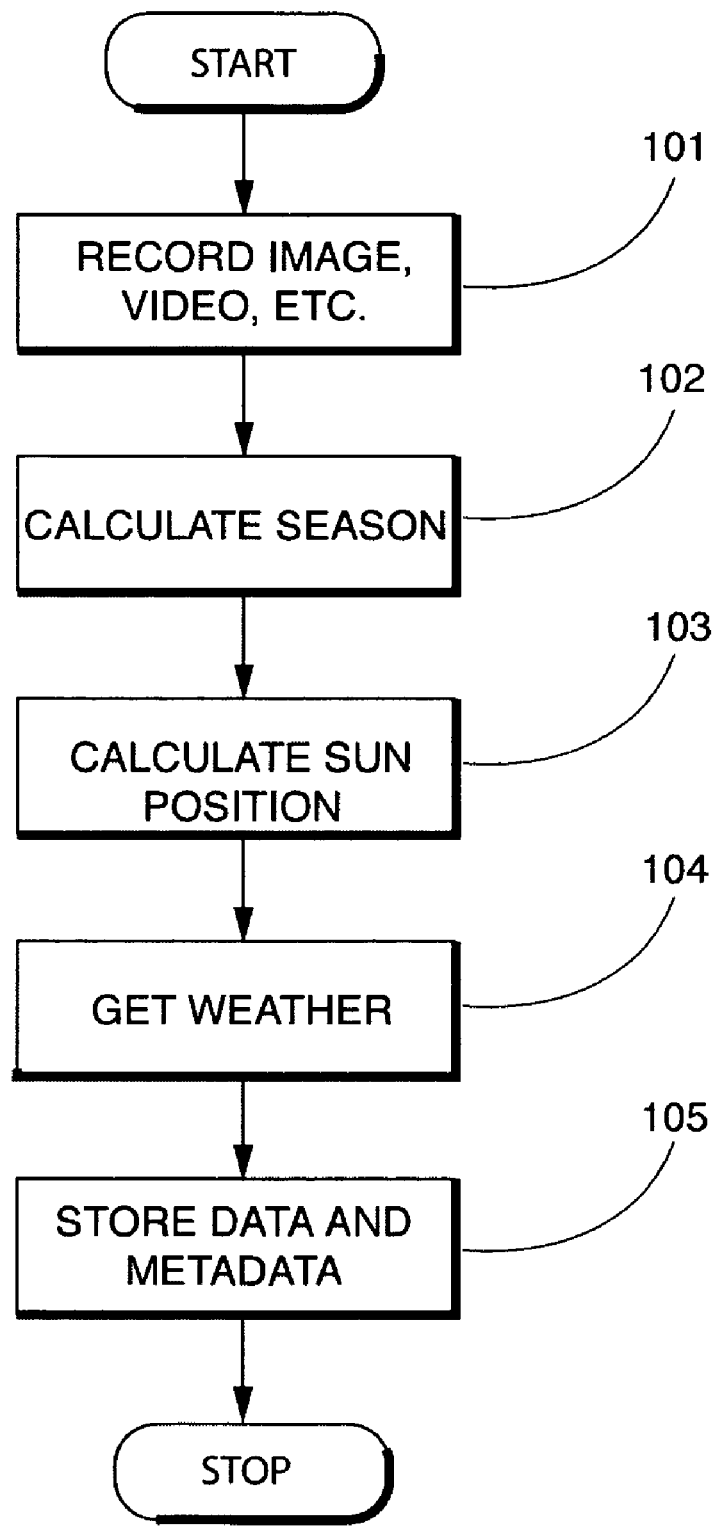
FIG. 2 is flow chart for a process for collecting images and image data in accordance with the invention.

Reference is made to FIG. 2 in which a flow chart for a method for creating a database in accordance with the invention is provided. In a step 101, camera 24 records an image of the view of interest at the remote location. This image may be in any known protocol, including, but not limited to, JPEG, TIFF, BMP, PCX, PNG or the like. The image may be either a still image or a video image such as MPEG or any variation thereof or the like.

When recording the image in step 101, the view is given a name, and physical information with respect to the location is stored, such as latitude, longitude, proper location name (i.e., Paris, Central Park), the date of the view, the time of the view and the offset from Greenwich Mean Time. Greenwich Mean Time may be utilized to calculate the true sun position. This data may be collected from stored data and tagged and linked to the image in the database or may be retrieved by server 12 from third party sources 20 by Internet, radio signal or other mode.

In a step 102, the season is calculated for the image based upon the date and latitude information. The latitude information is utilized because the seasons change as one crosses the equator even on the same date.

In a step 103, the position of the sun is calculated at the location of the view. Values are assigned to the sun as it traces its arc across the sky. By way of example, sunrise may be given a value of 0.000 and sunset may be assigned a value of 0.500. As a result, the sun is at its highest point in the sky at local midday and has a value of 0.250. If the sun is exhibiting a value of 0.750, it is at the midpoint between sunset and sunrise, i.e. the dead of night. Therefore, the position of the sun can either be empirically measured and stored or may be determined utilizing astrophysics, the date, time, season, latitude and longitude.

For example, if a photo is taken in New York City's Central Park on September 9, it is known that sunrise and sunset occur at 6:30 am and 7:15 pm respectively. The highest position of the sun would occur at 12:52 pm and be assigned a value of 0.250. However, a photo taken at the same instant in Boston's Public Garden where sunset and sunrise are shifted relative to New York City so that sunrise occurs at 6:17 am and sunset at 7:04 pm, the sun would be lower in the sky. The value for the sun at 12:52 pm in Boston's Public Garden would be between 0.250 and 0.500.

In a step 104, information about the location of the viewer, which may be remote or at the same place as the image recorded in step 101 is obtained. In the first instance, the local weather is determined. The zip code or address, including city and state or other readily used geographical indicia such as GPS data in a PDA is stored in database 22 and associated with the viewer. As will be disclosed later, the address or zip code or other geographical indicia is utilized to determine local weather utilizing known in the art third party weather source providers such as on line weather reports.

Furthermore, as a supplement to or in place of, knowing the viewer's location, the date and time, the local sun position may be calculated on behalf of the viewer. The weather data determined in step 104, the sun position data calculated in step 103, the season data determined in step 102 and the image obtained in step 101 are all stored with the associated metadata such as location, sun position, weather, date and season in the database 22 in accordance with a step 105. The system has now been initialized for virtual weather display of a remote location in accordance with the invention.

Figure 3:
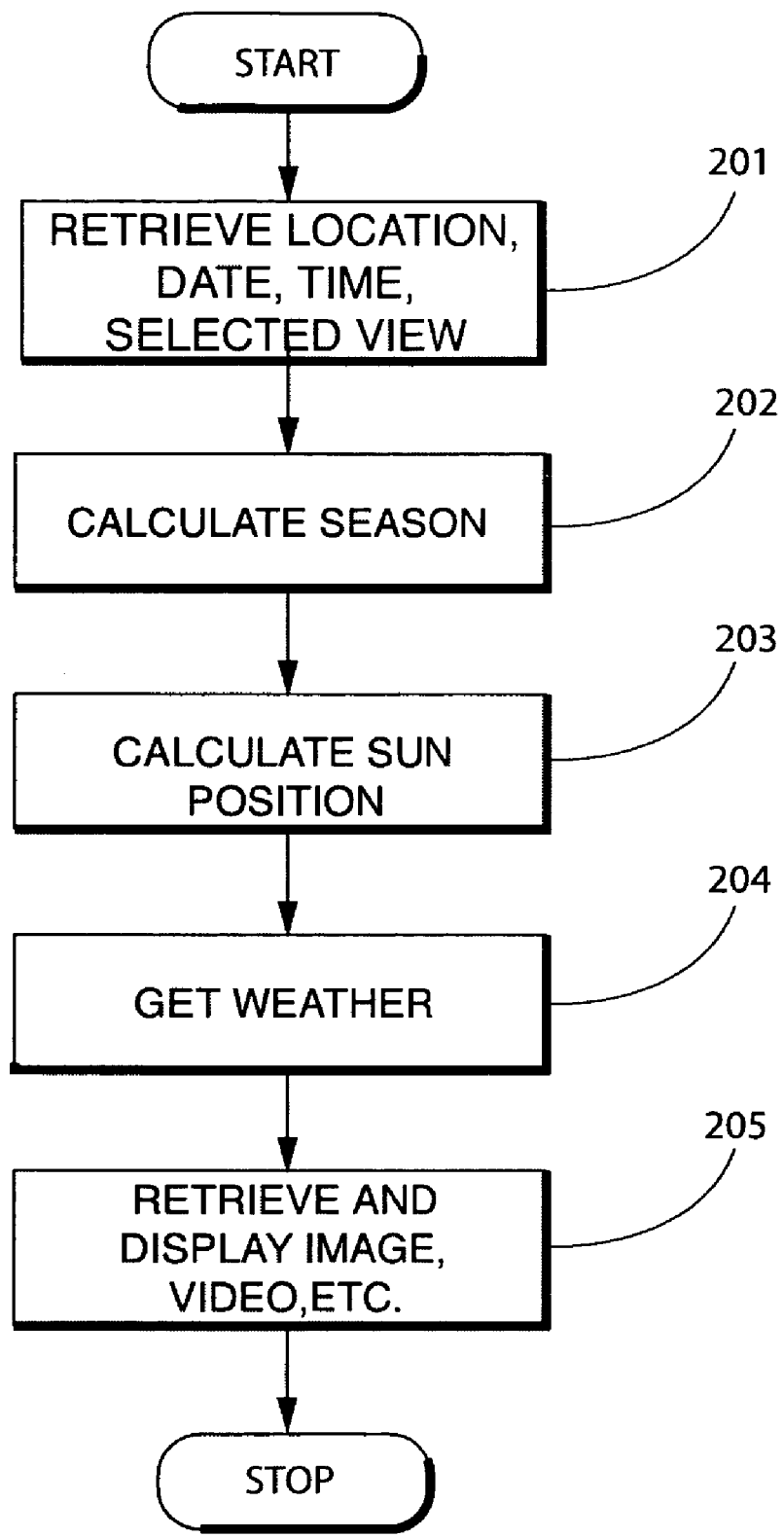
FIG. 3 is a flow chart of a process for retrieving and presenting images from a remote location to a viewer in accordance with the invention.

Reference is now made to FIG. 3 wherein a flow chart showing a method for displaying virtual weather of a remote location for the viewer. In a step 201, the current date and time is determined from the onboard computer clock of computer 16 by way of example. The location of computer 16 is either previously stored at server 22 in step 104, or may be calculated by data stored on the hard drive of computer 16, or a GPS device associated with computer 16.

A selected remote view name is input, such as Paris, France, Grand Canyon, Eiffel Tower, Himalayas or the like to indicate the geographical location for the desired view as named in step 101. The viewer's local location, latitude and longitude are retrieved from database 22. The local season at the viewer's location is calculated from the date and latitude data obtained in step 201 or by server 12 retrieving the local weather from third party source 20 utilizing some or all of the location information. The sun's position in the sky for the viewer's current location is calculated from the location data, date and time in a step 203. Again, the position of the sun in the sky is assigned a number in the scale discussed above.

In a step 204, the weather condition, as determined in steps 201-203 are utilized to retrieve the stored weather image having the same characteristics, i.e. date, time, corresponding season, and sun position and local weather conditions (presence of rain, presence of clouds or the like) as the weather identified in step 204. Server 12 compares the local weather characteristics, date, time and sun, as determined in steps 201-204, with similar characteristics associated with the images as stored in step 105. In step 205, server 12 retrieves the corresponding images for that weather at the desired remote location and displays the retrieved image at computer 16. Steps 201-205 are repeated until viewing stops.

In this manner, someone sitting at their desk in one location can determine what the weather under similar conditions to the local weather would look like at a remote location, accounting for date, time of day and local weather characteristics. Therefore, if it is raining in New York, a rainy day in Paris will be shown whether it is sunny in Paris, nighttime in Paris or the like. It should be readily understood that rather than automatically utilizing the local time, date and weather conditions to set the parameters for the retrieved remote view, viewer 14 could input the starting parameters for the desired weather. Therefore, if they were viewing the virtual view at two in the afternoon in New York on a rainy day, they could request a clear sunset over the Himalayas in the spring or the fall as opposed to the local mid-afternoon weather conditions. Therefore, regardless of the local weather, one can obtain a virtual view of a remote location under desired weather conditions. Similarly, one can choose the local location as the remote location. For example, for viewers sequestered in a cubicle in Alexandria, Va., they may wish a virtual window of the local view. By choosing Alexandria, Va., the system would show them a view as it currently existed (local and remote time and weather being identical), or the viewer could even use the computer to input weather variables to create a virtual view of a sunny day on an actual rainy one. This is done by utilizing weather condition inputs at computer 16 rather than from third party weather source 20.

While this invention has been particularly shown and described with references to preferred embodiments thereof, it will be understood by those skilled in the art that various changes in form and details may be made therein without departing from the scope of the invention encompassed by the appended claims.

What is claimed as new and desired to be protected by Letters Patent of the United States is:

1. A method for displaying a weather-related image of a remote location at a local computer comprising the steps of:
   storing a plurality of digital images of the remote location, each digital image displaying one of a plurality of weather conditions associated with the remote location;
   storing data associated with each respective image, said data being capable of being used to identify a respective one of the plurality of weather conditions associated with each image;
   inputting a desired weather condition at the local computer;
   selecting an image of the remote location as a function of the input to select a digital image corresponding to a digital image that displays the one of a plurality of weather conditions which is similar to the desired weather condition; and
   displaying the selected image at the local computer.

2. The method of claim 1, wherein the weather condition includes a position of the sun in the sky.

3. The method of claim 1, wherein the data includes at least one of time, date, cloud presence and rain presence.

4. The method of claim 1, wherein the desired weather condition is a local weather condition experienced at a geographical location of the local computer.

5. The method of claim 4, further comprising the steps of determining the local weather by determining a geographical location of the local computer, utilizing the geographical location of the local computer at a third party weather data source to determine the local weather.

6. The method of claim 4, further comprising the step of determining the geographical location of the local computer by utilizing one of the zip code or city and state of the geographical location at which the local computer resides.

7. The method of claim 1, further comprising the step of providing audio associated with the image displayed at the local computer.

8. A system for providing a weather-related image of a remote location at a local computer comprising:
   a local computer having an associated geographical address;
   a server in communication with said local computer;
   a database associated with said server;
   a camera at a location remote from said local computer, for obtaining images of a location remote from said local computer, in communication with said server, said server storing, at the database, a plurality of digital images obtained by said camera, and storing data associated with each respective image in said database, said data being capable of being used to identify a respective remote weather condition associated with each image, said server determining a desired weather condition input at said local computer and selecting an image, from said database as a function of said input, which exhibits a weather condition similar to the desired weather condition and the server transmitting the selected image to the local computer for display.

9. The system of claim 8, wherein the desired weather condition is a local weather condition corresponding to weather at the location of the local computer, the server determining the local weather by determining a geographical location of the local computer, and utilizing the geographical location to determine the weather.

10. The system of claim 9, further comprising a third party data source, said server communicating with said third party data source and communicating the geographical location of the local computer to the third party data source to determine the local weather at the local computer.

11. The system of claim 9, wherein said server and said local computer are located at the same geographical location.

12. The system of claim 8, wherein said database is a portable database.

* * * * *